United States Patent [19]

Yuasa et al.

[11] Patent Number: 5,751,584

[45] Date of Patent: May 12, 1998

[54] METHOD FOR CHECKING INTERFERENCE, METHOD FOR CHECKING PROCESSING PROGRAM, AND METHOD FOR CHECKING PROCESSING PROPRIETY

[75] Inventors: Akihiko Yuasa; Yutaka Noda; Satoshi Kumamoto; Makoto Kawano; Toshiyuki Hirose, all of Shizuoka-ken, Japan

[73] Assignee: Toshiba Kikai Kabushiki Kaisha, Tokyo, Japan

[21] Appl. No.: 514,666

[22] Filed: Aug. 14, 1995

[30] Foreign Application Priority Data

Aug. 15, 1994 [JP] Japan .................. 6-191525

[51] Int. Cl.⁶ ................... G06F 19/00; G06G 7/6466
[52] U.S. Cl. ................ 364/474.2; 364/474.16; 364/474.17; 364/474.05; 364/474.08
[58] Field of Search .............. 364/474.12, 468.04, 364/468.02, 474.08, 474.05, 474.16, 474.17, 474.2

[56] References Cited

U.S. PATENT DOCUMENTS

| | | | |
|---|---|---|---|
| 3,829,750 | 8/1974 | Centner et al. | 318/561 |
| 4,031,368 | 6/1977 | Colding et al. | 235/151 |
| 4,136,957 | 1/1979 | Uno et al. | 356/394 |
| 4,146,924 | 3/1979 | Brik et al. | 364/513 |
| 4,187,051 | 2/1980 | Kirsch et al. | 414/744 |
| 4,236,794 | 12/1980 | Gordon | 354/25 |
| 4,316,657 | 2/1982 | Suzuki et al. | 354/23 D |
| 4,393,449 | 7/1983 | Takeda et al. | 364/474 |
| 4,513,366 | 4/1985 | Munekata et al. | 364/167 |
| 4,547,847 | 10/1985 | Olig et al. | 364/148 |
| 4,613,269 | 9/1986 | Wilder et al. | 364/153 |
| 4,618,938 | 10/1986 | Sandland et al. | 364/552 |
| 4,659,220 | 4/1987 | Bronte et al. | 356/237 |
| 4,667,113 | 5/1987 | Nakajima et al. | 250/561 |
| 4,693,038 | 9/1987 | Vetter | 51/165 |
| 4,869,813 | 9/1989 | Bailey et al. | 209/538 |
| 4,878,736 | 11/1989 | Hekker et al. | 350/162.13 |
| 4,916,640 | 4/1990 | Gasperi et al. | 364/521 |
| 5,062,052 | 10/1991 | Sparer et al. | 364/473 |
| 5,084,827 | 1/1992 | Demesy et al. | 364/474.37 |
| 5,095,204 | 3/1992 | Noivini | 250/223 B |
| 5,097,587 | 3/1992 | Yasuda | 29/568 |
| 5,255,199 | 10/1993 | Barkman et al. | 364/474.17 |
| 5,289,282 | 2/1994 | Tsuji et al. | 348/624 |
| 5,291,393 | 3/1994 | Matsumoto et al. | 364/191 |
| 5,387,061 | 2/1995 | Barkman et al. | 409/80 |

FOREIGN PATENT DOCUMENTS

| | | |
|---|---|---|
| 0 089 561 A2 | 3/1983 | European Pat. Off. |
| 0 096 830 A3 | 6/1983 | European Pat. Off. |
| 0 129 091 A3 | 5/1984 | European Pat. Off. |
| 0 355 454 A2 | 7/1989 | European Pat. Off. |
| 0 395 470 A1 | 4/1990 | European Pat. Off. |
| 0 450 113 A1 | 4/1990 | European Pat. Off. |
| WO 89/01850 | 3/1989 | WIPO |
| WO 93/23820 | 11/1993 | WIPO |

*Primary Examiner*—Reba I. Elmore
*Assistant Examiner*—Ramesh Patel
*Attorney, Agent, or Firm*—Finnegan, Henderson, Farabow, Garrett & Dunner, L.L.P.

[57] ABSTRACT

The processing material's shape data is obtained by measuring the three-dimensional shape of the processing material W by the three-dimensional measuring device 45, the machine's shape data defining the three-dimensional shape of the machine side including the main shaft head provided with the processing tool and the tool holder attached thereto is obtained, and whether the coordinate position of said processing material given by said processing material's shape data is in the space to be occupied by the machine given by said machine's shape data or not is determined at the relative movement position between the main shaft head (43) and the work table (35) by the execution of the processing program by the arithmetic processing by means of an arithmetic processing means, and when the coordinate position of the processing material W is in the space to be occupied by the machine, it is determined that the processing material W and the machine interfere with each other.

10 Claims, 10 Drawing Sheets

FIG. 5

| (b) | | | | (a) | | UNIT / mm |
|---|---|---|---|---|---|---|
| PRODUCT'S SHAPE DATA | | | | PROCESSING MATERIAL'S SHAPE | | |
| Xp | Yp | Zp | | Xw | Yw | Zw |
|  |  |  |  | ~ |  |  |
|  | ~ |  |  | 89.4 | 100.1 | 97.5 |
| 90.0 | 100.0 | 94.2 | | 91.0 | 100.2 | 98.4 |
| 95.0 | 100.0 | 97.5 | | 93.0 | 100.4 | 106.1 |
| 100.0 | 100.0 | 100.0 | | 94.2 | 99.5 | 108.8 |
| 105.0 | 100.0 | 98.5 | | 95.6 | 100.0 | 102.0 |
| 110.0 | 100.0 | 96.0 | | 97.0 | 100.8 | 105.9 |
|  |  |  |  | 99.5 | 101.2 | 106.4 |
|  |  |  |  | 101.3 | 100.5 | 104.9 |
|  | ~ |  |  | 103.7 | 100.7 | 104.6 |
|  |  |  |  | 105.4 | 99.7 | 104.0 |
|  |  |  |  | 107.6 | 100.4 | 104.0 |
|  |  |  |  | 110.2 | 100.0 | 102.5 |
|  |  |  |  | 112.3 | 101.1 | 100.3 |
|  |  |  |  | ~ |  |  |

FIG. 6

UNIT / mm

| PROCESSING MATERIAL'S SHAPE DATA | | | DIFFERENCE IN THE Z DIRECTION |
|---|---|---|---|
| Xw | Yw | Zw | |
| ~ | ~ | ~ | ~ |
| 89.4 | 100.1 | 97.5 | 3.3 |
| 91.0 | 100.2 | 98.4 | 4.2 |
| 93.0 | 100.4 | 106.1 | 8.6 |
| 94.2 | 99.5 | 108.8 | 11.3 |
| 95.6 | 100.0 | 102.0 | 4.5 |
| 97.0 | 100.8 | 105.9 | 8.4 |
| 99.5 | 101.2 | 106.4 | 6.4 |
| 101.3 | 100.5 | 104.9 | 4.9 |
| 103.7 | 100.7 | 104.6 | 6.1 |
| 105.4 | 99.7 | 104.0 | 5.5 |
| 107.6 | 100.4 | 104.0 | 8.0 |
| 110.2 | 100.0 | 102.5 | 6.5 |
| 112.3 | 101.1 | 100.3 | 4.3 |
| ~ | | | ~ |

FIG. 7

UNIT / mm

| PRODUCT'S SHAPE DATA | | | DIFFERENCE IN THE NORMAL-TO-A-SURFACE DIRECTION |
|---|---|---|---|
| Xp | Yp | Zp | $\Delta L$ |
| | ~ | | ~ |
| 90.0 | 100.0 | 94.2 | 3.75 |
| 95.0 | 100.0 | 97.5 | 7.9 |
| 100.0 | 100.0 | 100.0 | 5.5 |
| 105.0 | 100.0 | 98.5 | 5.8 |
| 110.0 | 110.0 | 96.0 | 7.25 |
| | ~ | | ~ |

METHOD FOR CHECKING INTERFERENCE, METHOD FOR CHECKING PROCESSING PROGRAM, AND METHOD FOR CHECKING PROCESSING PROPRIETY

BACKGROUND OF THE INVENTION

1. Field of the Invention

The present invention relates to a method for checking interference, a method for checking processing program, and a method for checking processing propriety for machine tools such as a NC machine tool.

2. Description of the Related Art

There have been known machine tools such as a machining center which executes processing programs by a NC device and the like, relatively shifts a work table on which a processing material is placed and a main shaft head in the axial direction of the machine coordinates by a feed command obtained by the execution of the processing program, and automatically performs processing of said processing material by a processing tool mounted to said main shaft head.

In such kinds of machine tools, particularly in large machine tools, it is preferred to check for every processing material before the processing whether the main shaft head provided with processing tools and tool holders mounted thereto and the processing material do not interfere (collide) with each other in the process of the relative movement positions between said main shaft head and said work table by the feed command, in order to prevent the machine tools from being broken and to prevent the processing material.

In order to check the interference, it has been conventionally carried out to place a processing material on the work table of the machine tool, execute the processing program in an idling state that the processing tool of the main shaft head is set free, relatively shift the main shaft head and the work table actually in the axial direction of the machine coordinates, and inspect visually the relationship between the main shaft head and the processing material on the work table in this state by the operator. In addition to this interference check, the operator inspects the difference of the margin to take up so as to find a preparation error of the processing program based on this inspection, to find the necessity to change the entering number of the processing program or to visually find the abnormal shapes of the processing material.

Since the interference check by visual inspection of the operator, finding of any preparation error of the processing program based on the difference of the margin to take up, finding the necessity to change the processing program and finding of an abnormal shape of the processing material are largely depending on the experience and the intuition of the operator, there is a possibility to cause mistakes, the work efficiency is bad and a large burden is imposed on the operator.

Recently, the precision in the data origination has been improved by preparing a processing program by Computer Aided Design/Computer Aided Manufacturing (CAD/CAM), therefore, in the molding processing which requires a lot of time to prove out, it has been partially tried to start the actual processing without spending time to prove out in order to shorten the time. In either case, however, there is no security that the main shaft head and the processing material never interfere with each other, and if the main shaft head and the processing material interfere, enormous loss may be caused.

SUMMARY OF THE INVENTION

The present invention has been completed turning attention to the above-mentioned problems. It is therefore the object of the present invention to provide an interference check method, a processing program check method and a processing propriety check method for machine tools, which perform the interference check, and find a preparation error of the processing program, find the necessity to change the processing program, find the abnormal shape of the processing material, and find an attachment error of tools automatically, exactly and efficiently without depending on the visual inspection of the operator, shorten the time for driving preparation including proving out, and carry out the processing efficiently and safely.

In order to attain the above object, the interference check method according to the present invention characterized in that it obtains the processing material's shape data by measuring the three-dimensional shape of the processing material by the three-dimensional measurement detector, obtains the machine's shape data defining the three-dimensional shape of the machine side including the main shaft head provided with the processing tool and the tool holder attached thereto, determines whether the coordinate position of said processing material given by said processing material's shape data is in the space to be occupied by the machine given by the machine's shape data or not at the relative movement position between the main shaft head of the machine tool and the work table by the arithmetic processing by means of an arithmetic processing means, and when the coordinate position of the processing material is in the space to be occupied by the machine, it is determined that the processing material and the machine interfere with each other.

In addition to the above-mentioned interference determination, the interference check method according to the present invention is characterised in that it obtains the actual tools's shape data by image-sensing the processing tool and the tool holder attached to the machine tool, obtains the tool's shape data defining the shape of the processing tool and the tool holder, comparatively verifies said actual tool's shape data and said tool's shape data by the arithmetic processing means, and when said actual tool's shape data and said tool's shape data are different, it is determined that it is an attachment error of the processing tool and the tool holder.

In order to attain the above-mentioned object, the processing program check method according to the present invention is characterized in that the three-dimensional shape of the processing material is measured by the three-dimensional measurement detector to obtain the processing material's shape data, as well as the product's shape data defining the three-dimensional shape of the product after having completed the processing is obtained, and whether the difference between the processing material's shape data and the product's shape data at the same coordinate position is larger than the standard margin to enter preliminarily prescribed or not is determined by the arithmetic processing by means of an arithmetic processing means, and when said difference is larger than the standard margin to enter, a command to change the processing program is issued.

Furthermore, to attain the above-mentioned object, the processing propriety check method according to the present invention is characterized in that the three-dimensional shape of the processing material is measured by the three-dimensional measurement detector to obtain the processing material's shape data, as well as the product's shape data defining the three-dimensional shape of the product after having completed the processing is obtained, and whether the difference between said processing material's shape data and the product's shape data at the same coordinate position is larger than the prescribed value or not is determined by the arithmetic processing by means of an arithmetic processing means, and when the difference between said processing material's shape data and the product's shape data at the same coordinate position is larger than the prescribed value, it is determined that it is a preparation error of said processing program or it is an abnormal shape of the processing material.

Furthermore, in either method described above, it may be a detailed characteristic that the measurement of the three-dimensional shape of the processing material by the three-dimensional measurement detector is carried out by using a holding means of said three-dimensional measurement detector and a three-dimensional shape-measuring device separate from the machine tool having a table which can position and arrange the processing material to the three-dimensional shape-measured position by said three-dimensional measurement detector, or the measurement of the three-dimensional shape of said processing material is carried out on the axis of coordinates of the machine tool by attaching said three-dimensional measurement detector instead of the processing tool to the main shaft head of the machine tool, and relatively shifting said main shaft head and the work table of the machine tool, on which the processing material is placed, in the axial direction of coordinates of the machine tool.

BRIEF DESCRIPTION OF THE DRAWINGS

FIGS. 5(a) and 5(b) are tables illustrating, respectively, one embodiment of the processing material's shape data and one embodiment of the product's shape data.

FIG. 6 is a table illustrating one embodiment of a difference table in the Z direction.

FIG. 7 is a table illustrating one embodiment of a difference table in the direction of the normal to a surface.

DESCRIPTION OF THE PREFERRED EMBODIMENT

One embodiment of the present invention will now be described in detail with reference to the accompanying drawings.

Figure 1:
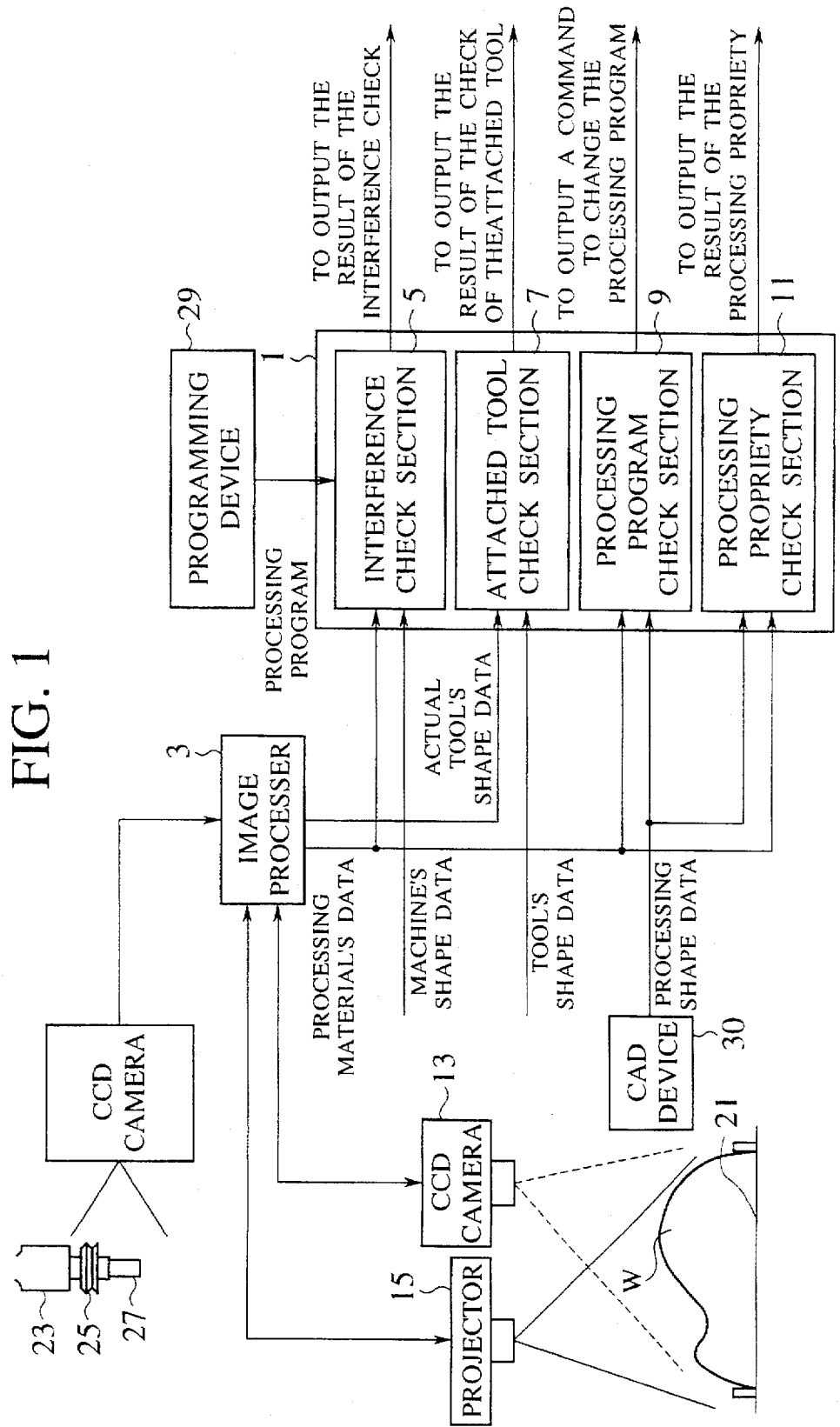
FIG. 1 is a view illustrating the structure of the system showing one embodiment of the inspection device used for the execution of each check method according to the present invention.

FIG. 1 is a view illustrating the structure of the system of the inspection device used for the execution of each check method according to the present invention. This inspection device has an arithmetic processor 1 and an image processor 3.

The arithmetic processor 1 is composed of a micro computer and the like, and includes an interference check section 5, an attached tool check section 7, a processing program check section 9 and a processing propriety check section 11.

To the image processor 3 are connected a three-dimensional image-sensing device 17 for image-sensing the processing material by a Changing Coupled Detector (CCD) camera 13 and a projector 15 as the three-dimensional measurement detector, and a CCD camera 19 for image-sensing the attached tool.

The image-sensing device 17 senses three-dimensionally the image of the processing material W positioned and arranged on the table 21 in a moir manner by the CCD camera 13 under the illumination of the parallel light lattice by the projector 15.

The CCD camera 19 senses the image of the tool holder 25 and the processing tool 27 attached to the main shaft 23 of the machine tool. This image-sensing may be two-dimensional, and the attached portion of the tool holder 25 and the processing tool 27 may be illuminated by an illumination device, though not shown in the drawing, in a back light manner to sense the tool holder 25 and the processing tool 27 as a shadow.

The image processor 3 inputs the image data output from the CCD camera 13, generates the processing material's shape data showing the three-dimensional shape of the processing material W in the three-dimensional coordinates for every 1 pixel of the sensed image, and outputs the processing material's shape data to the arithmetic processor 1.

Furthermore, the image processor 3 generates the actual tool's shape data showing the shapes of the tool holder 25 and the processing tool 27 for every 1 pixel of the sensed image by inputting the image data output from the CCD camera 19, and outputs the actual tool's shape data to the arithmetic processor 1.

The interference check portion 5 inputs the processing material's shape data from the image processor 3 and the processing program of the processing material W from the programming device 29, respectively, and inputs also the machine's shape data defining the three-dimensional shape of the machine side including the main shaft head provided with the processing tool and the tool holder attached thereto, and determines by the arithmetic processing whether the coordinate position of the processing material W given by the processing material's shape data is in the space to be occupied by the machine given by the machine shape data or not at the relative movement position between the main shaft head and the work table of the machine tool by the feed command described in the processing program, and when the coordinate position of the processing material is in the space to be occupied by the machine, it is determined that the processing material and the machine interfere with each other and outputs the interference check result.

The attached tool check section 7 inputs the actual tool's shape data from the image processor 3, and inputs the tool's shape data defining the shapes of the processing tool and the tool holder, comparatively verifies the actual tool's shape data and the tool's shape data to determine whether the actual tool's shape data and the tool's shape data are different or not, and when they are different, determines that it is the attachment error of the processing tool and the tool holder and outputs the attached tool check result. This comparison of the shape data in the attached tool check section 7 may be the three-dimensional data or the two-dimensional data, and in the case of the comparison by the three-dimensional shape data, the tool's shape data may invoke the machine's shape data in the interference check described above, and in the case of the comparison by the two-dimensional shape data, the tool's shape data may be the one in which the machine's shape data in the above-mentioned interference check is converted to the two-dimensional shape data.

The processing program check section 9 inputs the processing material's shape data and the product's shape data defining the three-dimensional shape of the processed product after having completed the processing from the image processor 3 and the CAD device 30, respectively, determines whether the difference between the processing material's shape data and the product's shape data at the same coordinate position is larger than the standard entering margin or not by means of the comparative arithmetic processing, and when said difference is larger than the standard entering margin, outputs a command to change the processing program.

The processing propriety check section 11 inputs the processing material's shape data and the product's shape data defining the three-dimensional shape of the processed product after having completed the processing from the image processor 3 and the Computer Aided Design (CAD) device 30, respectively, determines whether the difference between the processing material's shape data and the product's shape data at the same coordinate position is larger than the prescribed value or not by means of the comparative arithmetic processing, and when said difference is larger than the prescribed value, determines that it is a preparation error of the processing program or it is an abnormal shape of the processing material to output the processing propriety result.

Figure 2:
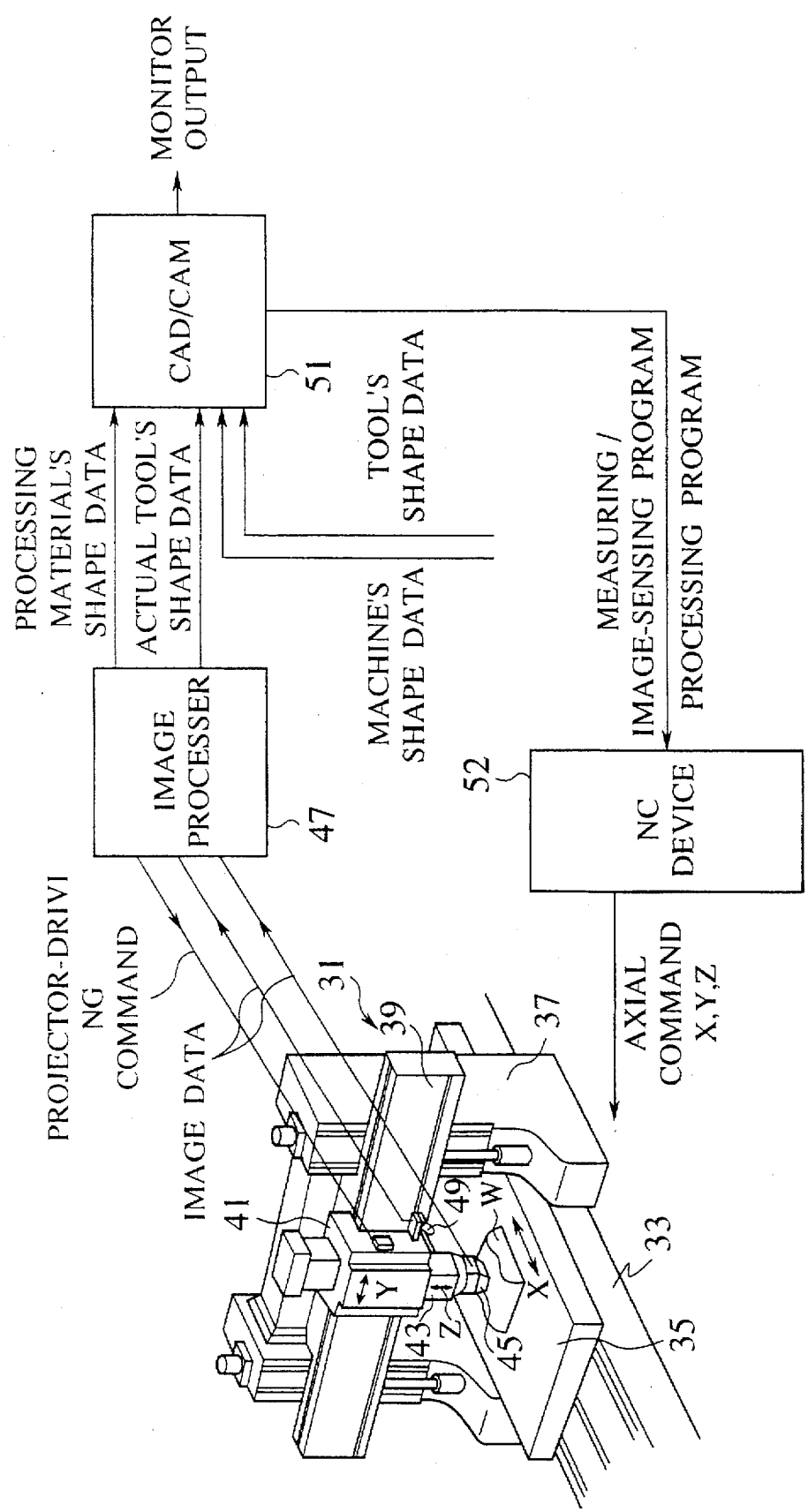
FIG. 2 is a view illustrating the structure of the system showing one embodiment of the system structure when each check method according to the present invention is executed by an on-machine method.

FIG. 2 is a view illustrating the structure of the system when each check method according to the present invention is executed on the machine tool by an on-machine method. A gate-shaped machining center 31 has a bed 33, a work table 35 arranged on the bed 33 and movable in the direction of the X-axis, a gate-shaped fixed frame 37 fixedly arranged striding over the bed 33 in the direction of the Y-axis, a cross beam 39 provided movably in the vertical direction (in a direction of the Z-axis) on the gate-shaped fixed frame 37, a saddle 41 provided movably in the direction of the Y-axis on the cross beam 39, and a ram 43 provided movably in the direction of the Z-axis on the saddle 41, and when the processing material W positioned and arranged on the work table 35 is three-dimensionally measured, a three-dimensional image-sensing head 45 comprising a CCD camera and a projector is attached downward at the lower end of the ram 43, instead of the processing head.

The three-dimensional image-sensing head 45 receives the projector-driving command from the image processor 47, senses the image of the processing material W positioned and arranged on the work table 35 three-dimensionally in a moir manner, and outputs the image data of the processing material W to the three-dimensional image processor 47.

On the saddle 41, there is attached a CCD camera 49 for the image-sensing of the attached tool which senses the images of the tool holder and the processing tool attached to the main shaft of the processing head attached to the ram 43 at the time of processing.

The image processor 47 inputs the image data from the CCD camera of the three-dimensional image-sensing head 45 and the CCD camera 49 for the image-sensing of the attached tool, generates the processing material's shape data showing the three-dimensional shape of the processing material W in the three-dimensional coordinates per one pixel of the image-sensed image, and outputs the processing material's shape data to the CAD/CAM device 51 in a computer system.

Furthermore, the image processor 47 inputs the image data from the CCD camera 49 for the image-sensing of the attached tool, generates the actual tool's shape data showing the shape of the tool holder and the processing tool attached to the main shaft per one pixel of the image-sensed image, and outputs the actual tool's shape data to the CAD/CAM device 51.

The CAD/CAM device 51 generates a product's shape data defining the three-dimensional shape of the processed product after having completed the processing by means of the CAD function, and generates the processing program of he NC from the product's shape data by means of the CAM function, to output the processing program to the NC device 52 of the gate-shaped machining center 31.

Furhtermore, the CAD/CAM device 51 outputs a measuring program to the NC device 52, and the NC device 52 outputs a command of each axis X, Y, and Z to the gate-shaped machining center 31 according to the measuring/image-sensing program at the time of measuring the three-dimensional shape of the processing material W by means of the three-dimensional image-sensing head 45, or at the time of image-sensing the attached tool by means of the CCD camera 49 for the image-sensing of the attached tool.

Thereby, when the three-dimensional shape of the processing material W is measured by the three-dimensional head 45, the relative position between the three-dimensional image-sensing head 45 and the processing material W is set to the position prescribed preliminarily.

The CAD/CAM device 51 inputs the processing material's shape data from the image processor 47 as well as the machine's shape data, and executes the check program, thereby performs the interference check, the attached tool check, the processing program check, and the processing propriety check.

Figure 3:
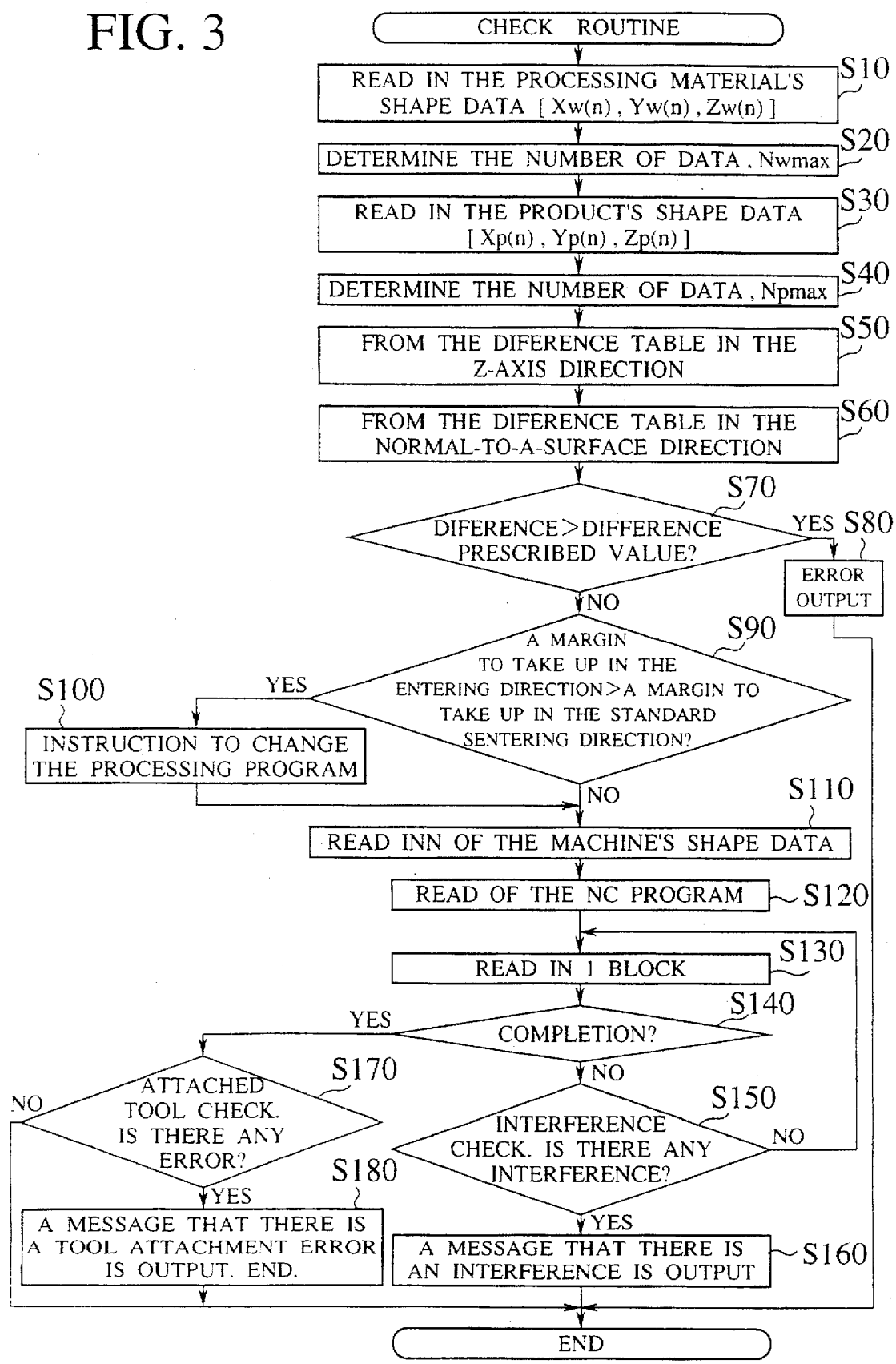
FIG. 3 is a flow chart illustrating the concrete execution process of the check methods according to the present invention.
Figure 4:
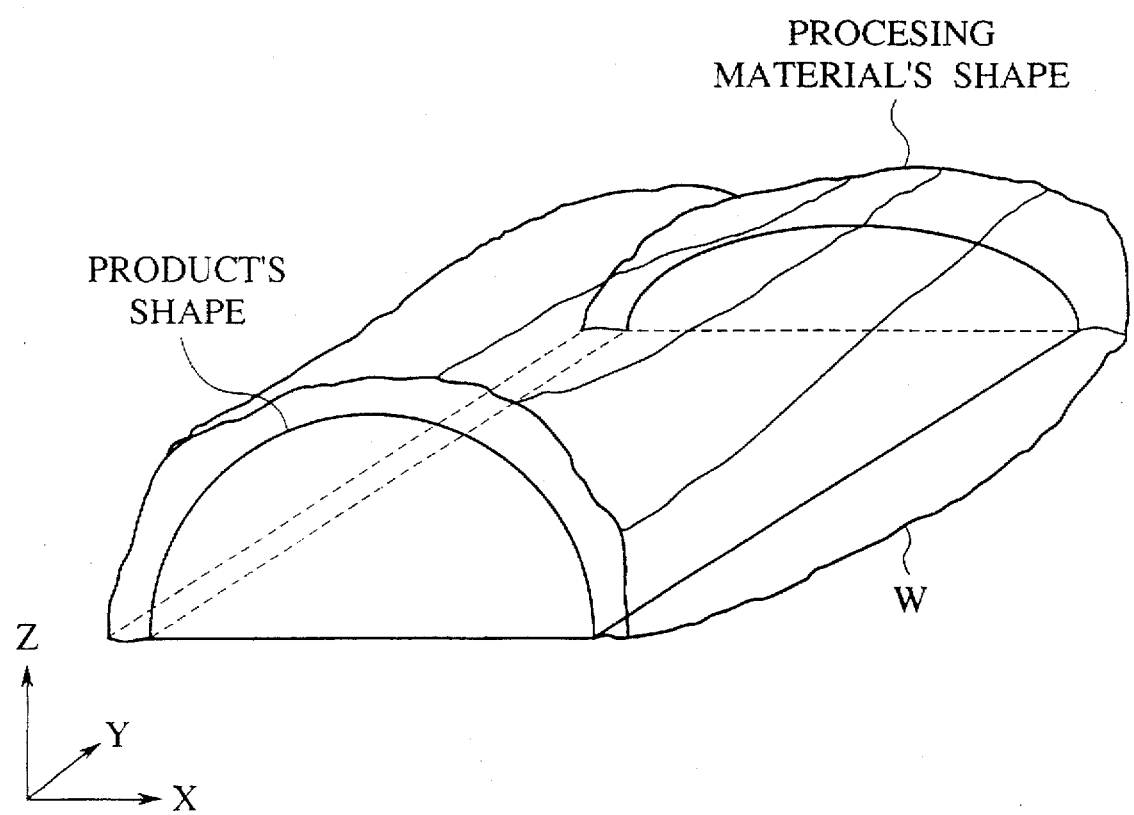
FIG. 4 is a perspective view showing one embodiment of the processing material shape and the product shape.

Next, the concrete execution process of the check methods according to the present invention will be described with reference to the flow chart shown in FIG. 3. In addition, FIG. 4 shows one embodiment of the processing material's shape and the product's shape.

First, read in the processing material's shape data [Xw(n), Yw(n), Zw(n)](Step 10), and determine the number of data (number of measured data) Nwmax (Step 20). FIG. 5(a) shows the example of data of the processing material's shape data [Xw(n), Yw(n), Zw(n)].

Next, read in the product's shape data [Xp(n), Yp(n), Zp(n)] defining the three-dimensional shape of the processed goods having completed the processing, that is, the product (Step 30), and determine the number of data (number of designed data) (Step 40). FIG. 5(b) shows the example of data of the product's shape data [Xp(n), Yp(n), Zp(n)].

Next, the difference $Zw(n)-Zp(n)=\Delta Z(n)$ between the coordinate value Zw(n) and Zp(n) in the direction of Z-axis of the processing material's shape data and the product's shape data is calculated for every data (n=1~Nwmax), and forms the difference table in the Z direction as shown in FIG. 6 (Step 50).

Furthermore, calculate the normal direction in each coordinate position to the surface of the processing material from the processing material's shape data [Xw(n), Yw(n), Zw(n)], and calculate the difference ΔL(n) in the normal-to-a-surface direction for every data (n=1~Nwmax) by the comparison of the processing material's shape data [Xw(n), Yw(n), Zw(n)] with the product's shape data [Xp(n), Yp(n), Zp(n)] to form the difference table in the normal-to-a-surface direction as shown in FIG. 7 (Step 60).

Next, as the processing propriety check, determine whether the difference in the Z direction ΔZ(n) is larger than the preset prescribed value of the difference in the Z direction, ΔZmax, for every data (n=1~Nwmax), and also determine whether the difference in the normal-to-a-surface direction ΔL(n) is larger than the preset prescribed value of the difference in the normal-to-a-surface direction, ΔLmax, for every data (n=1~Nwmax) (Step 70), and if one of the relations of ΔZ(n)>ΔZmax, or ΔL(n)>ΔLmax is realized, it is determined as a preparation error of the processing program or an abnormal shape of the processing material W to output the error signal, and complete the check routine (Step 80).

When this processing propriety check is completed in the conformed state, determination whether the difference in the Z direction ΔZ(n) or the difference in the face-normal direction ΔL(n) is larger than the margin to enter in the standard entering direction ΔC preliminarily set as a margin to take up in the entering direction is carried out as the processing program check for every data (n=1~Nwmax) (Step 90), and if either the relation of ΔZ(n)>ΔC or ΔL(n)>ΔC is realized, a message for the processing program change to quicken the change of the processing number is output on the monitor (Step 100).

By this output on the monitor, the monitor screen of the CAD/CAM device 49 becomes the editing screen of the processing program, and the processing program on the line where the change of the processing number is required is displayed on the screen.

Thereby, the operator executes to change the processing number. In addition, the number of change of the processing number is set automatically by the internal processing with the CAD/CAM device, and it may be such that the operator confirms only Yes or No regarding the change of the processing number.

When the above-mentioned processing propriety check and the processing program check are completed, the interference check will be started. In the interference check, first the shape data of the main shaft head and the shape data of the tool holder are read in as machine informations, and the shape data by the diameter and the shaft length of the tool is read in as the tool information (Step 110). These data are preliminarily input to the CAD/CAM device 49 for every main shaft head and every tool, and by combining these data, the machine's shape data defining the three-dimensional shape of the machine including the main shaft head provided with a processing tool and a tool holder attached thereto can be obtained.

Then, read in the NC program as the processing program (Step 120), and execute the interference check for every block (Steps 130–150). This interference check is to determine whether the main shaft head including the processing tool and the tool holder at the relative movement position between the main shaft head and the work table 35 which is defined by the feed command in each block of the NC program collides with the processing material W on the work table 35, and calculate the coordinate value in the space to be occupied by the machine from the relative movement position data between the main shaft head and the work table 35 and the machine's shape data, determine whether the coordinate position of the processing material W is in the space to be occupied by the machine by comparison of this coordinate value with the processing material's shape data [Xw(n), Yw(n), Zw(n)], and when the coordinate position of the processing material W is in the space to be occupied by the machine, determine that the processing material W and the machine interfere with each other. If they interfere with each other, a message representing that they interfere is output on the monitor (Step 160), and complete the check routine.

When the processing material W and the machine do not interfere, the attached tool check is conducted (Step 170). This attached tool check is to comparatively verify the actual tool's shape data and the tool's shape data and to determine whether the actual tool's shape data and the tool's shape data are different or not, and when they are different, determine that it is an attachement error of the processing tool and the tool holder, and output a message representing that it is a tool attachment error on the monitor (Step 180).

Figure 8:
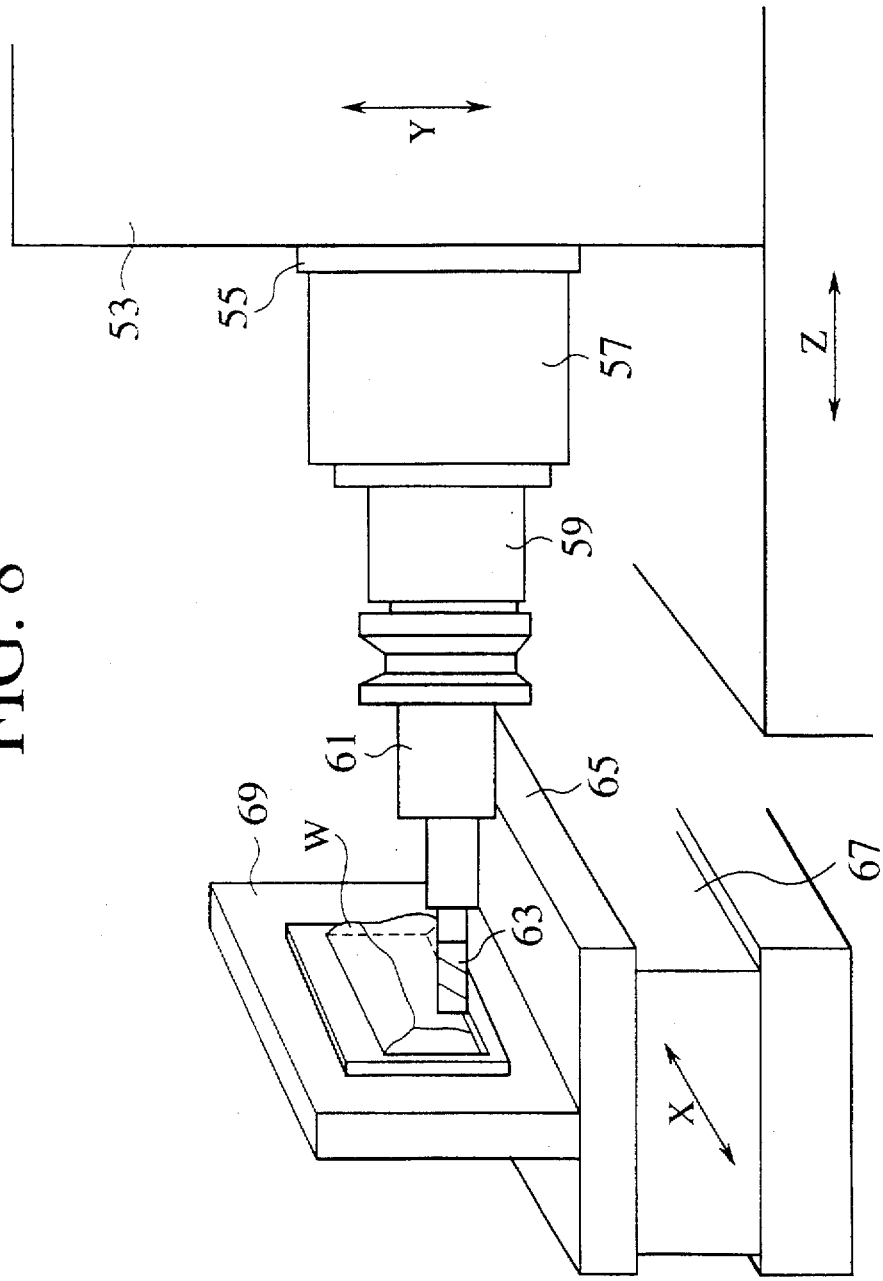
FIG. 8 is a view illustrating a definite embodiment of the interference check.

Next, the concrete embodiment of the interference check will be described with reference to FIGS. 8–11. As shown in FIG. 8, a main shaft 59 is attached to a ram 55 of a saddle 53 by an attachment 57, and to the tip of the main shaft 59, a processing tool 63 is exchangeably attached by a tool holder 61, and the processing tool 63 is movable in the directions of Y-axis and Z-axis.

The work table 65 is movable in the direction of X-axis on the bed 67, and a processing material W is attached on the table surface by a jig 69.

Figure 9:
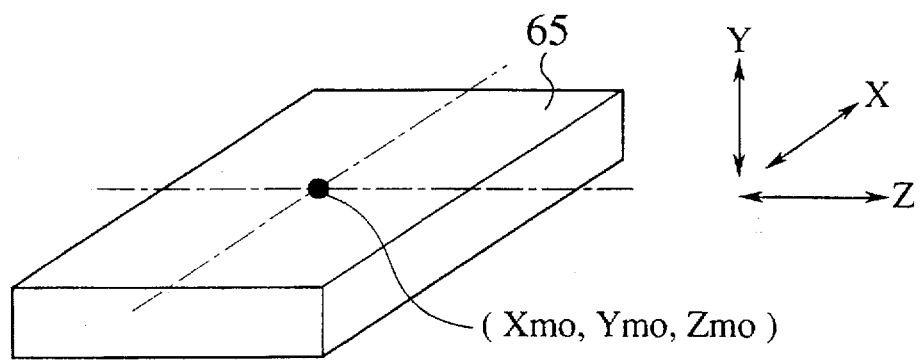
FIG. 9 is a view illustrating an embodiment to set up the reference coordinates of the machine.
Figure 10:
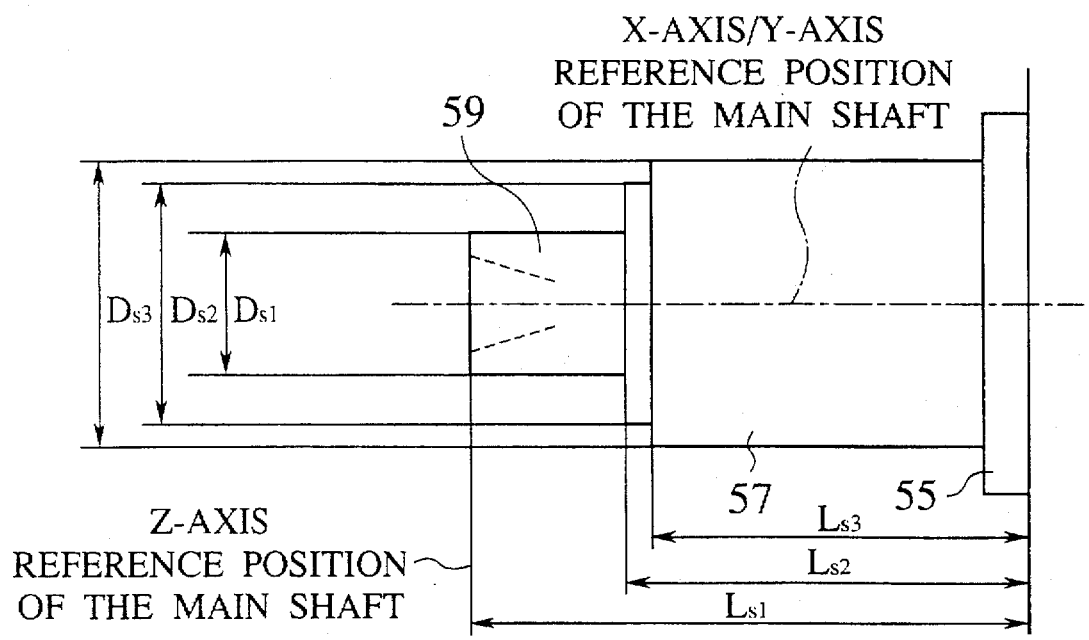
FIG. 10 is a side view showing the shape of the main shaft head portion.
Figure 11:
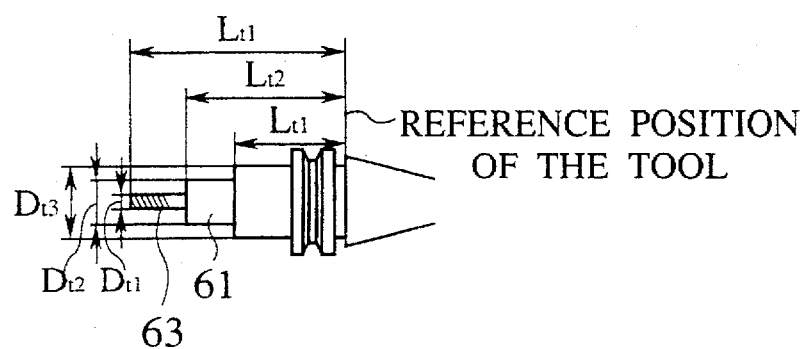
FIG. 11 is a side view showing the shape of the tool portion.

Here, as shown in FIG. 9, assume the machine coordinate in the center of the work table 65 to be the machine's reference coordinate value $(Xm_0, Ym_0, Zm_0)$, and as shown in FIG. 10, assume the tip face of the main shaft 57 to be the Z-axis reference position of the main shaft, the rotational center position of the main shaft 57 to be the X-axis reference position of the main shaft, and the Y-axis reference position of the main shaft to be $Ys_0$, and assume the dimensions of respective portions to be $Ls_1$, $Ls_2$, $Ls_3$, $Ds_1$, $Ds_2$, $Ds_3$. Moreover, as shown in FIG. 11, assume the dimensions of respective portions of the tool holder 61 and the processing tool 63 to be $Lt_1$, $Lt_2$, $Lt_3$, $Dt_1$, $Dt_2$, $Dt_3$. In addition, the machine's reference coordinate value $(Xm_0, Ym_0, Zm_0)$ is the origin of the position to be attached of the material to be processed W in the work table 65, and it shows the deviation with the coordinate value of the machine's origin.

If it is assumed that the difference between the origin of the work coordinate systems of the processing material W attached on the work table 65 by the jig 69 and the machine's reference coordinate value $(Xm_0, Ym_0, Zm_0)$ is $(Xori, Yori, Zori)$, the coordinate value $(Xwm(n), Ywm(n), Zwm(n))$ in the machine coordinate systems of the processing material W can be determined by the following equation. This coordinate value $(Xwm(n), Ywm(n), Zwm(n))$ is a global coordinate value with respect to the coordinate value of the machine's origin.

$$Xwm(n) = Xm_0 + Xw(n) - Xori$$

$$Ywm(n) = Ym_0 + Yw(n) - Yori$$

$$Zwm(n) = Zm_0 + Zw(n) - Zori$$

If it is assumed that the coordinate position in the machine coordinate systems of the main shaft portion including the processing tool 63 is (Xtm, Ytm, Ztm), and that the coordinate position by the NC data is (Xnc, Ync, Znc), the coordinate position (Xnc, Ync, Znc) by the NC data and the coordinate position (Xtm, Yt, Ztm) in the machne coordinate systems are converted by the following equation:

$$Xtm=Xnc$$

$$Ytm=Ync$$

$$Ztm(k)=Znc-Zm_0-L(k)$$

Provided that in L(k=1~6).

$$L_1=Lt_1$$

$$L_2=Lt_2$$

$$L_3=Lt_3$$

$$L_4=-Ls_1$$

$$L_5=-Ls_1+Ls_2$$

$$L_6=-Ls_1+Ls_3.$$

At the coordinate position (Xtm, Yt, Ztm), the determination whether the coordinate position Pn (Xwm(n), Ywm(n), Zwm(n)) in the machine coordinate systems of the processing material W is included in the cylindrical space C(k) determined by the radius R(k) and the shaft length L(k) is carried out by the numerical calculation.

Provided that in R (k=1~6), $$R_1=Dt1/2$$

$$R_2=Dt2/2$$

$$R_3=Dt3/2$$

$$R_4=Ds1/2$$

$$R_5=Ds2/2$$

$$R_6=Ds3/2$$

c (K=1~6)=cylindrical space of respective portions by Radius R (k=1~6) and shaft length L (k=1~6).

If the coordinate position Pn is not within the cylindrical space C(k), it means "there is no interference", and if the coordinate position Pn is included within the cylindrical space C(k), it means "there is interference".

Furthermore, a numerical formula showing a surface S made by a surface of the processing material W is formed from the coordinate position Pn (Xwm(n), Ywm(n), Zwm(n)) in the machine coordinate systems of the processing material W, and at the coordinate position (Xtm, Ytm, Ztm), determination whether the cylindrical space C(k) determined by the radius R(k) and the shaft length L(k) and the surface S cross over or not is carried out by the numerical calculation.

If the cylindrical space C(k) and the surface S do not cross over, it means "there is no interference", and if the cylindrical space C(k) and the surface S cross over, it means "there is interference".

In addition, the measurement of the three-dimensional shape of the processing material may be carried out other than on the work table of the machine tool, by using a three-dimensional shape-measuring device separate from the machine tool having a holding means of the three-dimensional measurement detector and a table which can position and arrange the processing material at the three-dimensional shape-measuring position by the three-dimensional measurement detector, and in which the table is constituted by the XY stage according to need.

Furthermore, the measurement of the three-dimensional shape of the processing material may be carried out by a three-dimensional shape-measuring device using a contact needle, other than using the image-sensing data by the three-dimensional image-sensing device using a CCD camera.

The present invention has heretofore been described in detail with regard to a particular embodiment, however, it will be obvious to those skilled in the art that the present invention is by no means limited to the particular embodiment and various embodiments are possible within the scope of the present invention.

As understood from the above description, according to the interference check method, the processing program check method, and the processing propriety check method for the machine tools by the present invention, the interference check, to find a preparation error of the processing program, to find the necessity to change the processing program, to find the abnormal shape of the processing material can be carried out automatically, exactly and efficiently without depending on the visual inspection of the operator by the comparison of the processing material's shape data, the machine's shape data and the product's shape data obtained by measuring the three-dimensional shape of the processing material by the three-dimensional measurement detector, and also it is carried out automatically and exactly without depending on the visual inspection of the operator by the comparative verification of the image-sensed data of the processing tool and the tool holder attached to the machine tool (actual tool's shape data) with the tool's shape data to find the attachment error of the tool, and the time for driving preparation including proving out can be shortened and the driving of the machine tools can be carried out efficiently and safely.

When the measurement of the three-dimensional shape of the processing material by the three-dimensional measurement detector is carried out by using a three-dimensional shape-measuring device separate from the machine tool, the machine tool is not occupied for measuring the three-dimensional shape of the processing material and the rate of operation of the machine tool is not decreased. Furthermore, when a plurality of processing materials are sequentially processed, during the processing of one processing material, measurement of the three-dimensional shape of the next processing material can be carried out, thereby the time required for the entire processing can be reduced.

On the other hand, when measurement of the three-dimensional shape of the processing material is carried out by the on-machine manner on the axis of coordinates of the machine tool by attaching a three-dimensional measurement detector instead of a processing tool to the main shaft head of the machine tool, and relatively shifting the main shaft head and the work table in the axial direction of coordinates of the machine tool, particular XY stage is not required for measuring the three-dimensional shape, and the positioning position of the processing material is not varied at the time of measuring the shape and at the time of processing, thereby the reliability of the interference check can be further improved.

What is claimed is:

1. A method for checking interference, comprising the steps of:

obtaining a configuration and size of a processing material by sensing a three-dimensional image of the processing material and converting the three-dimensional image to three dimensional coordinates;

obtaining a machine's shape data defining the three-dimensional shape of the machine side including a main shaft head provided with a processing tool and a tool holder attached thereto;

determining whether the three-dimensional coordinates of said processing material is in the space to be occupied by the machine given by the machine's shape data at a relative movement position between the main shaft head of the machine tool and a work table by an arithmetic processing of an arithmetic processing means; and when the three-dimensional coordinates of the processing material are in the space to be occupied by the machine, determining that the processing material and the machine will interfere with each other.

2. A method for checking interference according to claim 1, wherein the processing tool and the tool holder attached to the machine tool is image-sensed to obtain the actual tool's shape data, and further a tool's shape data defining the shape of the processing tool and the tool holder is obtained, and the comparative verification between the actual tool's shape data and the tool's shape data is carried out by the arithmetic processing means, and when said actual tool's shape data and the tool's shape data are different, it is determined that it is an attachement error of the processing tool and the tool holder.

3. A method for checking interference according to claim 1, wherein the measurement of the configuration and size of the processing material is carried out by using a three-dimensional shape-measuring device which is separate from the machine tool and which has a holding means, and a table which can position and arrange the processing material at the position of the three-dimensional coordinates.

4. A method for checking interference according to claim 1, wherein measurement of the configuration and size of said processing material is carried out on an axis of coordinates of the machine tool by attaching a three-dimensional measurement detector instead of a processing tool to the main shaft head of the machine tool and relatively shifting the work table of the machine tool on which said processing material is placed and said main shaft head in the coordinate direction of the machine tool.

5. A method for checking a processing program, comprising the steps of:

obtaining a configuration and size of a processing material by sensing a three-dimensional image of the processing material and converting the three-dimensional image into three-dimensional coordinates as well as obtaining a product's configuration and size defining the three-dimensional shape of the product after having completed the processing;

determining whether the difference between said processing material's configuration and size and the product's configuration and size at the same coordinate position is larger than a standard margin to enter preliminarily prescribed or not by an arithmetic processing by an arithmetic processing means; and when said difference is larger than the standard margin, issuing a command to change the processing program.

6. A method for checking a processing program according to claim 5, wherein the measurement of the configuration and size of the processing material is carried out by using a three-dimensional shape-measuring device which is separate from the machine tool and which has a holding means, and a table which can position and arrange the processing material at the position of the three-dimensional coordinates.

7. A method for checking a processing program, according to claim 5, wherein measurement of the configuration and size of said processing material is carried out on an axis of coordinates of the machine tool by attaching a three-dimensional measurement detector instead of a processing tool to a main shaft head of the machine tool and relatively shifting a work table of the machine tool on which said processing material is placed and said main shaft head in the coordinate direction of the machine tool.

8. A method for checking processing propriety, comprising the steps of:

obtaining a configuration and size of a processing material by, sensing a three-dimensional image of the processing material and converting the three-dimensional image into three-dimensional coordinates, as well as obtaining a product's configuration and size defining the three-dimensional shape of the product after having completed the processing;

determining whether the difference between said processing material's configuration and size and the product's configuration and size at the same coordinate position is larger than a prescribed value by an arithmetic processing of an arithmetic processing means; and when the difference between said processing material's configuration and size and the product's configuration and size at the same coordinate position is larger than the prescribed value, determining whether it is a preparation error of said processing program or it is an abnormal shape of the processing material.

9. A method for checking processing propriety according to claim 8, wherein the measurement of the configuration and size of the processing material is carried out by using a three-dimensional shape-measuring device which is separate from the machine tool and which has a holding means, and a table which can position and arrange the processing material at the position of the three-dimensional coordinates.

10. A method for checking processing propriety according to claim 8, wherein measurement of the configuration and size of said processing material is carried out on an axis of coordinates of the machine tool by attaching a three-dimensional measurement detector instead of a processing tool to a main shaft head of the machine tool and relatively shifting a work table of the machine tool on which said processing material is placed and said main shaft head in the coordinate direction of the machine tool.

* * * * *